(12) United States Patent
Xiao et al.

(10) Patent No.: US 9,023,440 B2
(45) Date of Patent: May 5, 2015

(54) LIQUID CRYSTAL ALIGNMENT FILM, METHOD FOR PREPARING SAME AND LIQUID CRYSTAL DISPLAY DEVICE COMPRISING SAME

(75) Inventors: Ang Xiao, Beijing (CN); Haibo Zhu, Beijing (CN); Sunghun Song, Beijing (CN); Wei Li, Beijing (CN); Zhiyong Liu, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 69 days.

(21) Appl. No.: 13/703,668

(22) PCT Filed: Sep. 7, 2012

(86) PCT No.: PCT/CN2012/081159
§ 371 (c)(1),
(2), (4) Date: Dec. 12, 2012

(87) PCT Pub. No.: WO2013/034105
PCT Pub. Date: Mar. 14, 2013

(65) Prior Publication Data
US 2013/0150523 A1    Jun. 13, 2013

(51) Int. Cl.
*C09K 19/00* (2006.01)
*C09D 179/08* (2006.01)
*G02F 1/1337* (2006.01)

(52) U.S. Cl.
CPC ........ *C09D 179/08* (2013.01); *G02F 1/133723* (2013.01); *G02F 1/133784* (2013.01)

(58) Field of Classification Search
CPC ............ C09D 179/08; G02F 1/133723; G02F 1/13378; G02F 1/133784; C08G 73/1067; C08G 73/1082

USPC ................... 428/1.1, 1.2, 1.26; 427/162, 164; 524/599, 600; 528/353; 349/123, 127
See application file for complete search history.

(56) References Cited

U.S. PATENT DOCUMENTS 5,608,033 A    3/1997 Nihira et al.

FOREIGN PATENT DOCUMENTS

| CN | 1116230 A | 2/1996 |
|---|---|---|
| CN | 101397287 A | 4/2009 |
| EP | 1020442 A1 | 7/2000 |
| JP | 03-077844 A | 4/1991 |
| JP | 2002-003454 A | 1/2002 |
| JP | 4168593 B2 | 10/2008 |
| JP | 2008-266262 A | 11/2008 |

OTHER PUBLICATIONS

International Preliminary Report on Patentability dated Mar. 12, 2014; PCT/CN2012/081159.
First Chinese Office Action dated May 5, 2014; Appln. No. 201110266038.X.
International Search Report: dated Dec. 13, 2012; PCT/CN2012/081159.

*Primary Examiner* — Gwendolyn Blackwell
*Assistant Examiner* — Ruiyun Zhang
(74) *Attorney, Agent, or Firm* — Ladas & Parry LLP

(57) ABSTRACT

The invention provides a liquid crystal alignment film, a method for preparing the same and a liquid crystal display device comprising the same. The alignment film comprises a polyimide obtained by reacting a compound as shown in Formula 2 or Formula 3 with an aromatic diamine as shown in Formula 1, wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl, and the Ar is an aryl. The liquid crystal alignment film has a tactic spatial configuration, decreases the π-π attractive interaction between the polyimide backbones, allows the directional and homogenous alignment of the liquid crystal molecules on the surface of the polyimide, and thereby increases the contrast of the liquid crystal display.

Formula 1
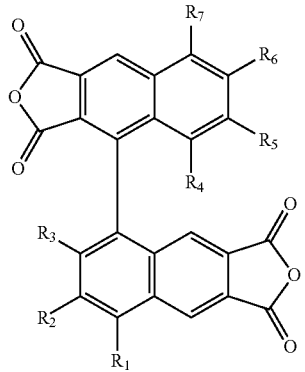
Formula 2
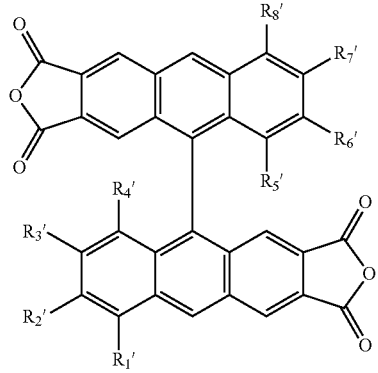
Formula 3
12 Claims, 4 Drawing Sheets

LIQUID CRYSTAL ALIGNMENT FILM, METHOD FOR PREPARING SAME AND LIQUID CRYSTAL DISPLAY DEVICE COMPRISING SAME

TECHNICAL FIELD

The invention relates to a liquid crystal alignment film, a method for preparing the liquid crystal alignment film, and a liquid crystal display device comprising the liquid crystal alignment film.

BACKGROUND

During the manufacture of the thin film transistor liquid crystal display, the homogeneity of the liquid crystal orientation directly affects various qualities of the display. In manufacture, the directional alignment of the liquid crystal molecules is usually achieved by coating an alignment film on the substrate. As shown in FIG. 1, the alignment film 2 coated on the surface of the substrate 1 is directionally aligned along the rubbing direction under the action of the rapidly rotating rubbing roller 3, and after the assembly of the thin film transistor (TFT) array substrate with the color filter (CF) substrate, the liquid crystal molecules are aligned along a certain direction through the anchoring effect of the alignment film on the surface liquid crystal molecules. The major component of the alignment film is polyimide. With the continuously elevating requirements on the display quality of the display, especially in high end display mode such as in plane switching (IPS), fringe field switching (FFS) and the like, the homogeneity of the directional alignment of the liquid crystal molecules is paid more and more attention. Therefore, the ability of the alignment film to pose a directional effect on the liquid crystal molecules also becomes a focus.

The traditional polyimide alignment film primarily involves the polymerization of pyromellitic dianhydride and p-phenylenediamine in a solvent (such as N-methylpyrrolidone (NMP)) to generate a polyamic acid and heat dehydration of the polyamic acid to form a polyimide alignment film (as shown in FIG. 2). By employing the aforementioned method, an improved polyimide alignment film can be obtained by the polymerization of the derivatives, analogs or modified species with side chain substitution of pyromellitic dianhydride and p-phenylenediamine. The polyimide alignment film obtained by this method has a structure of long, single and straight chains, and between the chains, stacking is formed through binding by intermolecular interaction such as π-π interaction, hydrogen bond, or spatial hindrance. As shown in FIG. 3, the liquid crystal molecule 5 is adsorbed onto the polyimide. The intermolecular interaction between the liquid crystal molecules and the polyimide determines the alignment of the liquid crystal molecules in the polyimide surface layer. Research shows that the shape of the backbone of the polyimide, the attractive effect between the aromatic rings on the backbone and the aromatic rings on the liquid crystal molecules, and the repulsive effect of the side chain alkyl on the liquid crystal molecules dominate the directional alignment of the liquid crystal molecules. In prior art, the directional force of the alignment film on the liquid crystal molecules is often strengthened by increasing the proportion or volume of the aromatic component in the polyimide backbone or embedding a long alkyl side chain. Since the traditional polyimde backbone is not completely a structure of a straight chain, enhancing the directional effect of the alignment film on the liquid crystal molecules by simply increasing the proportion or volume of the aromatic component will cause too strong π-π interaction between the chains in the polyimide which causes the backbones of the polyimide to bind each other, thereby causing the liquid crystal molecules adsorbed onto the surface of the polyimide alignment film to have different twisting angles in different regions of the polyimide back bone, which in turn causes the inconsistency among the alignment directions of the liquid crystal molecules 5 in different regions of the polyimide backbone 4 (resulting in the situation as shown in FIG. 3). This will prevent the liquid crystal molecules from aligning in a good directional and consistent manner, cause the decrease of the contrast of the liquid crystal display, and thus cause the drop of the display quality of the liquid crystal display.

SUMMARY

The invention provides a liquid crystal alignment film, in which the configuration of the polyimide backbone in the alignment film is changed to reduce the π-π interaction between the polyimide backbones to make the alignment film structure more tactic, which is more advantageous to the directional and consistent alignment of the liquid crystal molecules, thereby increasing the contrast of the display. The invention also provides a method for preparing the liquid crystal alignment film and a liquid crystal display device comprising this liquid crystal alignment film.

Another aspect of the invention provides a liquid crystal alignment film comprising a polyimide which is obtained by reacting a compound as shown in Formula 2 or Formula 3 with an aromatic diamine of Formula 1,

$$H_2N-Ar-NH_2 \qquad \text{Formula 1}$$

wherein the Ar in Formula 1 is an aryl,

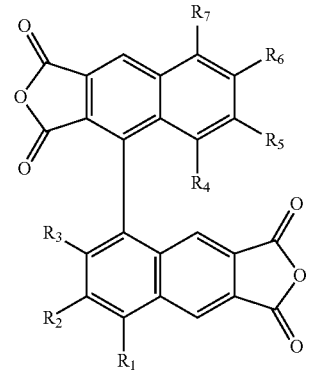

Formula 2

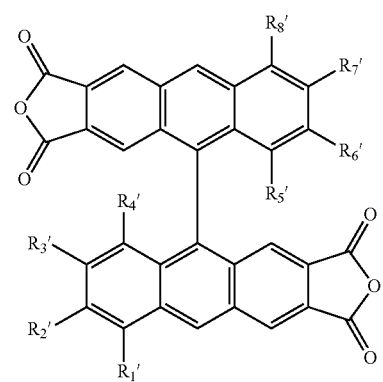

Formula 3 wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl. In this specification, halo refers to fluoro, chloro, bromo or iodo, preferably fluoro or chloro.

More specifically, the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is an alkyl containing 1-10 carbon atoms, an aralkyl containing 6-20 carbon atoms or a haloalkyl containing 1-10 carbon atoms; the Ar includes an aryl or an optionally substituted aryl, for example, a phenyl, a biphenylyl or a diphenyl ether radical.

For example, the alkyl is a methyl, an ethyl, a n-propyl, an isopropyl, a n-butyl, an isobutyl or a t-butyl.

For example, the aralkyl is a phenyl, a tolyl, a benzyl or a triphenylmethyl.

For example, the haloalkyl is a difluoromethyl or a trifluoromethyl.

Another aspect of the invention further provides a liquid crystal display device comprising the aforementioned liquid crystal alignment film.

Still another aspect of the invention further provides a method for preparing the liquid crystal alignment film comprising following steps:

1) under nitrogen protection, a compound as shown in Formula 2 or Formula 3 is mixed with an aromatic diamine of Formula 1 in a solvent and agitated to obtain a polyamic acid;

2) the polyamic acid is evenly coated onto the substrate and subject to heating to obtain the polyimide liquid crystal alignment film;

for example, the duration of mixing and agitation in the step 1) is 24 h; in the step 2), after the polyamic acid is evenly coated onto the substrate, the polyamic acid is first subject to heating at 80-100° C. for 1 h, then at 210-240° C. for 1 h;

for example, the solvent is N-methylpyrrolidone, γ-butyrolactone, or ethylene glycol monobutyl ether;

for example, the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is an alkyl containing 1-10 carbon atoms, an aralkyl containing 6-20 carbon atoms or a haloalkyl containing 1-10 carbon atoms; the Ar is a phenyl, a biphenylyl or a diphenyl ether radical.

For example, the alkyl is a methyl, an ethyl, a n-propyl, an isopropyl, a n-butyl, an isobutyl or a t-butyl; the aralkyl is a phenyl, a tolyl, a benzyl or a triphenylmethyl; the haloalkyl is a difluoromethyl or a trifluoromethyl.

Specifically, the following technical solutions are provided herein:

<1> A liquid crystal alignment film comprising a polyimide, wherein the polyimide is obtained by reaction of a compound as shown in Formula 2 or Formula 3 with an aromatic diamine of Formula 1, $$H_2N-Ar-NH_2 \qquad \text{Formula 1}$$

wherein the Ar in Formula 1 is an aryl,

Formula 1

Formula 2

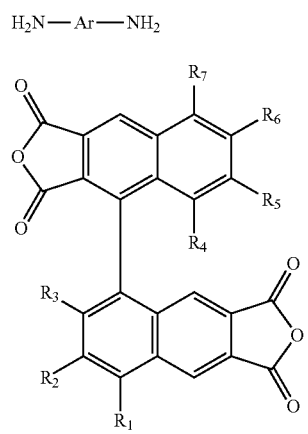

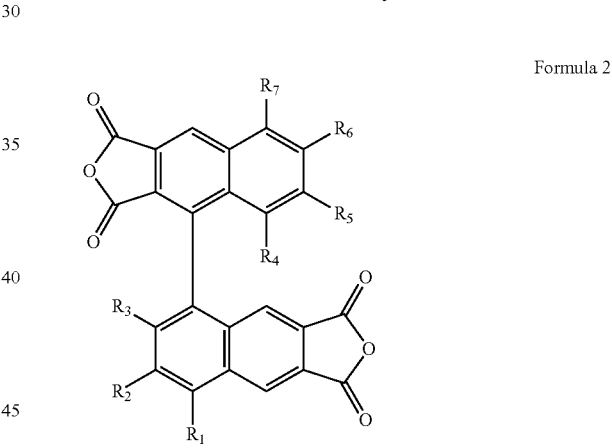

Formula 3

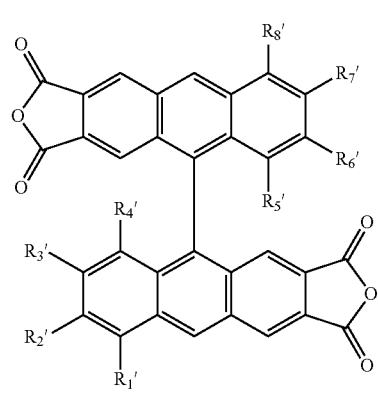

wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl, and the Ar in Formula 1 is an aryl;

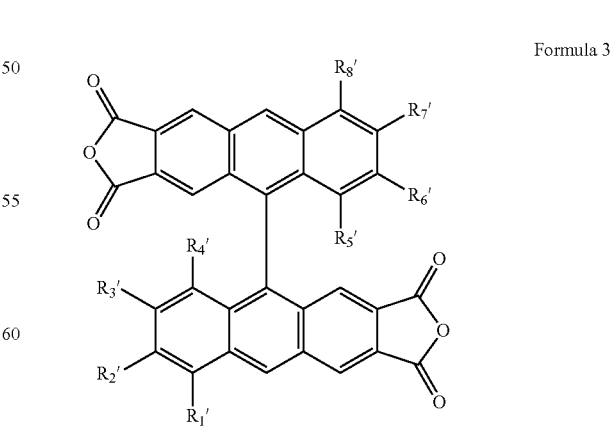

wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl.

<2> The liquid crystal alignment film according to <1>, wherein the polyimide comprises a recurring structural unit having following general formula:

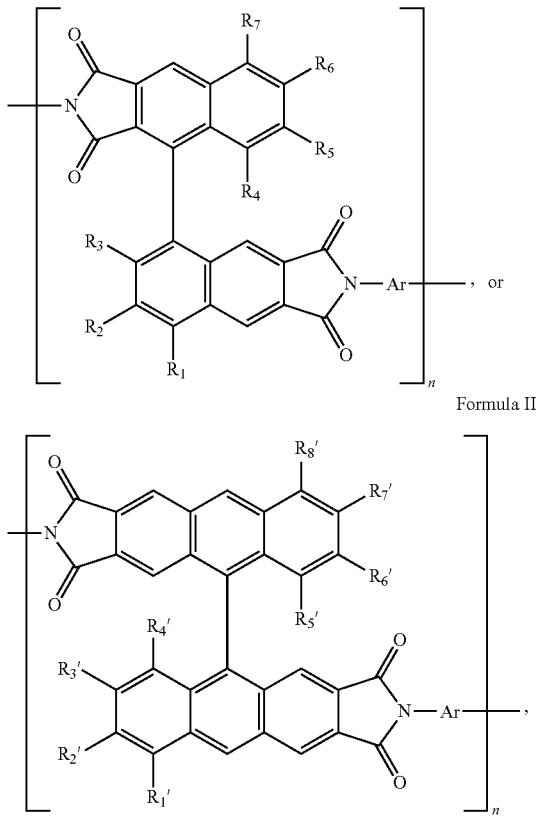

Formula I

Formula II wherein
Ar is an aryl,
the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl,
n is an integer of 2-20.

<3> The liquid crystal alignment film according to <1>, wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is an alkyl containing 1-10 carbon atoms, an aralkyl containing 6-20 carbon atoms or a haloalkyl containing 1-10 carbon atoms; the Ar is a phenyl, a biphenylyl or a diphenyl ether radical.

<4> The liquid crystal alignment film according to <3>, wherein the alkyl is a methyl, an ethyl, a n-propyl, an isopropyl, a n-butyl, an isobutyl or a t-butyl.

<5> The liquid crystal alignment film according to <3>, wherein the aralkyl is a phenyl, a tolyl, a benzyl or a triphenylmethyl.

<6> The liquid crystal alignment film according to <3>, wherein the haloalkyl is a difluoromethyl or a trifluoromethyl.

<7> A liquid crystal display device, wherein said liquid crystal display device comprises the liquid crystal alignment film according to <1>.

<8> A method for preparing a liquid crystal alignment film comprising following steps:
1) under nitrogen protection, a compound as shown in Formula 2 or Formula 3 is mixed with an aromatic diamine of Formula 1 in a solvent and agitated to obtain a polyamic acid;

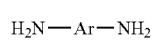

Formula 1

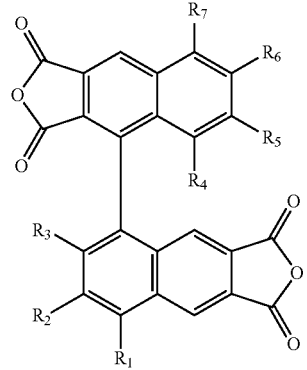

Formula 2

Formula 3 wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl, and the Ar in Formula 1 is an aryl;
2) the polyamic acid is evenly coated onto the substrate and subject to heating to obtain the polyimide liquid crystal alignment film;

<9> The method of preparation according to <8>, wherein the duration of mixing and agitation in the step 1) is 24 h; in the step 2), after the polyamic acid is evenly coated onto the substrate, the polyamic acid is first subject to heating at about 80-100° C., for example, for 1 h, then at about 210-240° C., for example, for 1 h.

<10> The method of preparation according to <8>, wherein the solvent is N-methylpyrrolidone, γ-butyrolactone or ethylene glycol monobutyl ether.

<11> The method of preparation according to <9>, wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is an alkyl containing 1-10 carbon atoms, an aralkyl containing 6-20 carbon atoms or a haloalkyl containing 1-10 carbon atoms; and the Ar is a phenyl, a biphenylyl or a diphenyl ether radical.

<12> The method of preparation according to <11>, wherein the alkyl is a methyl, an ethyl, a n-propyl, an isopropyl, a n-butyl, an isobutyl or a t-butyl; the aralkyl is a phenyl, a tolyl, a benzyl or a triphenylmethyl; and the haloalkyl is a difluoromethyl or a trifluoromethyl.

BRIEF DESCRIPTION OF THE DRAWINGS

In order to more clearly illustrate the technical solutions of the embodiments of the invention, the figures of the embodiments will be briefly introduced below. Apparently, the figures described below merely involve some embodiments of the invention, rather than limiting the invention.

ILLUSTRATION OF THE SIGNS IN THE FIGURES

1. Substrate
2. Alignment film
3. Rubbing Roller
4. Polyimide Backbone
5. Liquid Crystal Molecule
6. Binaphthyl tetracarboxylic dianhydride
7. Aromatic Diamine
8. Polyimide
9. Substituent

DETAILED DESCRIPTION

The liquid crystal alignment film of the invention comprises a polyimide obtained from a reaction between a compound as shown in Formula 2 or Formula 3 with an aromatic diamine of Formula 1.

$$H_2N-Ar-NH_2 \quad \text{Formula 1}$$

wherein the Ar in Formula 1 is an aryl, in particular a phenyl (Formula 1a), a biphenylyl (Formula 1b) or a diphenyl ether radical (Formula 1c) or the like.

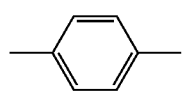
Formula 1a

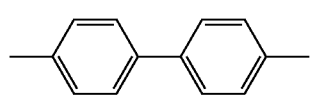
Formula 1b

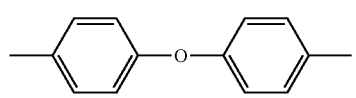
Formula 1c

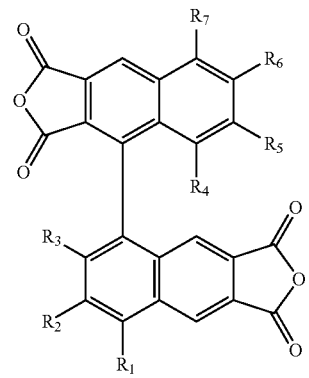
Formula 2

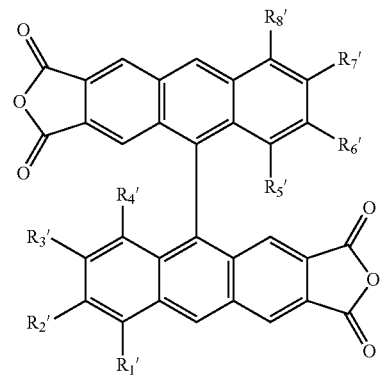
Formula 3 wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ can be H, an alkyl (preferably alkyl containing 1-10 carbon atoms), an aralkyl (preferably aralkyl containing 6-20 carbon atoms) or a haloalkyl (preferably haloalkyl containing 1-10 carbon atoms) or the like.

Specifically, the polyimide provided in the invention has following general formula:

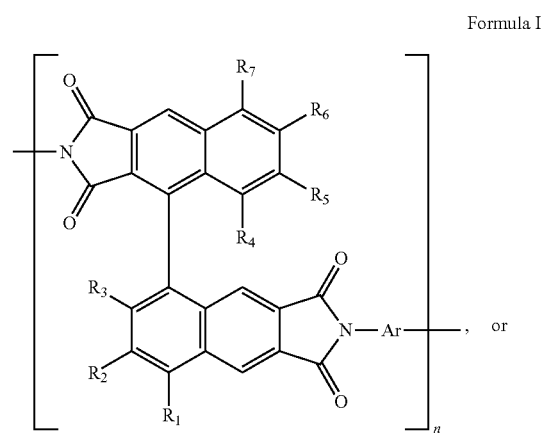
Formula I

Formula II

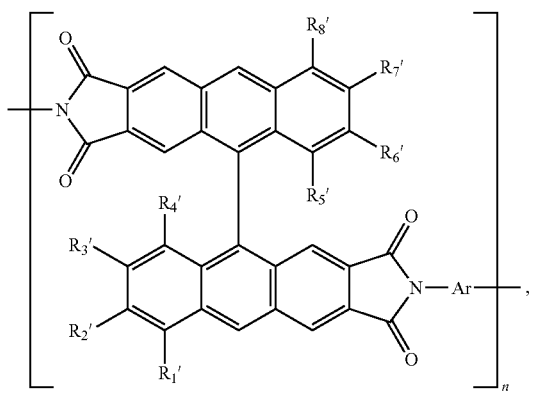

wherein
Ar is an aryl,
the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl;
n is an integer of 2-20, preferably an integer of 3-15, more preferably an integer of 3-10, and most preferably an integer of 5-8.

In the aforementioned polyimide, the alkyl can specifically be a methyl, an ethyl, a n-propyl, an isopropyl, a n-butyl, an isobutyl or a t-butyl or the like; the aralkyl can be a phenyl, a tolyl, a benzyl or a triphenylmethyl or the like; the haloalkyl can preferably be a difluoromethyl or a trifluoromethyl, of course can also be another haloalkyl, such as a dichloromethyl or a trichloromethyl or the like, and is not limited hereto. In Formula 2, the $R_1$, $R_2$, $R_3$, $R_4$, $R_5$, $R_6$, and $R_7$ can be the same or different substituents. In particular, when $R_1$, $R_2$, $R_3$, $R_4$, $R_5$, $R_6$, and $R_7$ are all H atom, the Formula 2 is binaphthyl tetracarboxylic dianhydride, that is, the compound as shown in Formula 2 in the invention is binaphthyl tetracarboxylic dianhydride and substituted binaphthyl tetracarboxylic dianhydride. For the same reason, In Formula 3 the $R_1'$, $R_2'$, $R_3'$, $R_4'$, $R_5'$, $R_6'$, $R_7'$ and $R_8'$ can be the same or different substituents. In particular, when $R_1'$, $R_2'$, $R_3'$, $R_4'$, $R_5'$, $R_6'$, $R_7'$ and $R_8'$ are all H atom, the Formula 3 is bianthracyl tetracarboxylic dianhydride, that is, the compound as shown in Formula 3 in the invention is bianthracyl tetracarboxylic dianhydride and substituted bianthracyl tetracarboxylic dianhydride.

Figure 1:
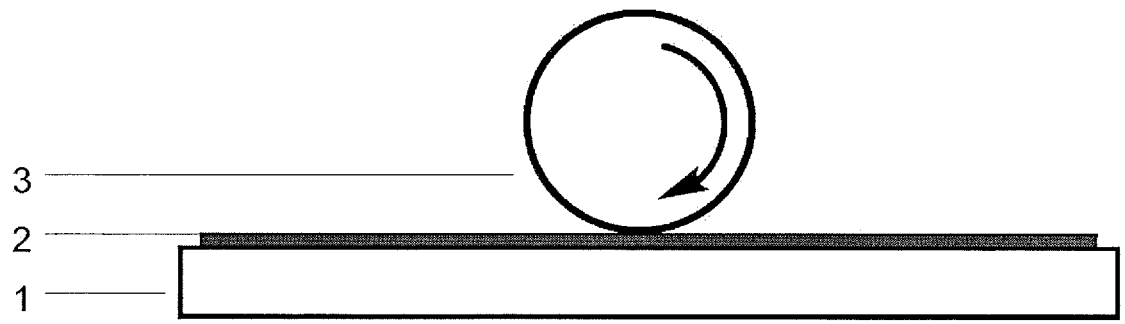
FIG. 1 is the schematic diagram of coating of the alignment film on the TFT substrate in the prior art.
Figure 2:
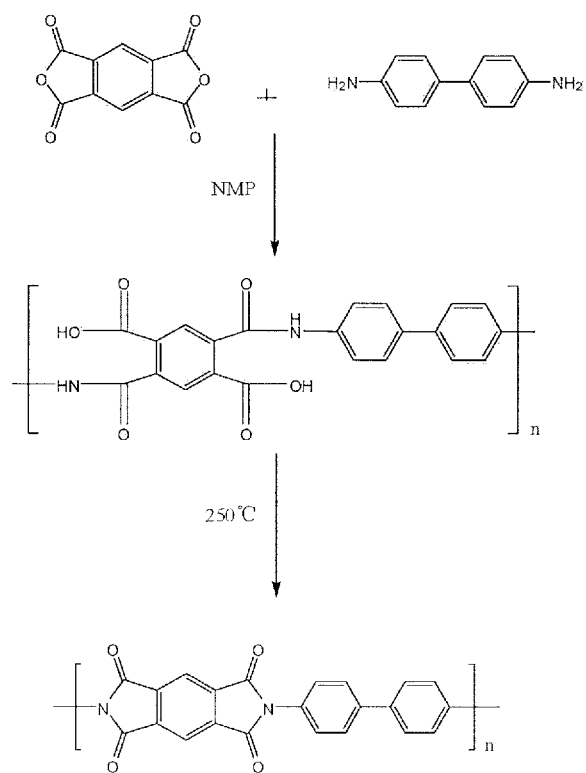
FIG. 2 is a schematic diagram of the reaction between pyromellitic dianhydride and p-phenylenediamine in a solvent to form polyimide.
Figure 3:
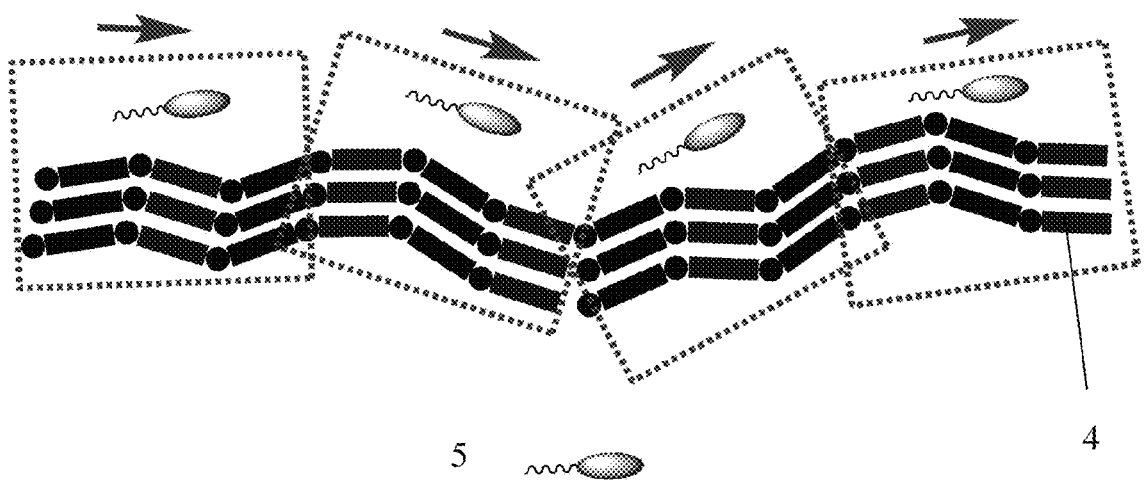
FIG. 3 is a schematic diagram of the directional alignment of liquid crystal molecules on the surface of the alignment film.
Figure 4:
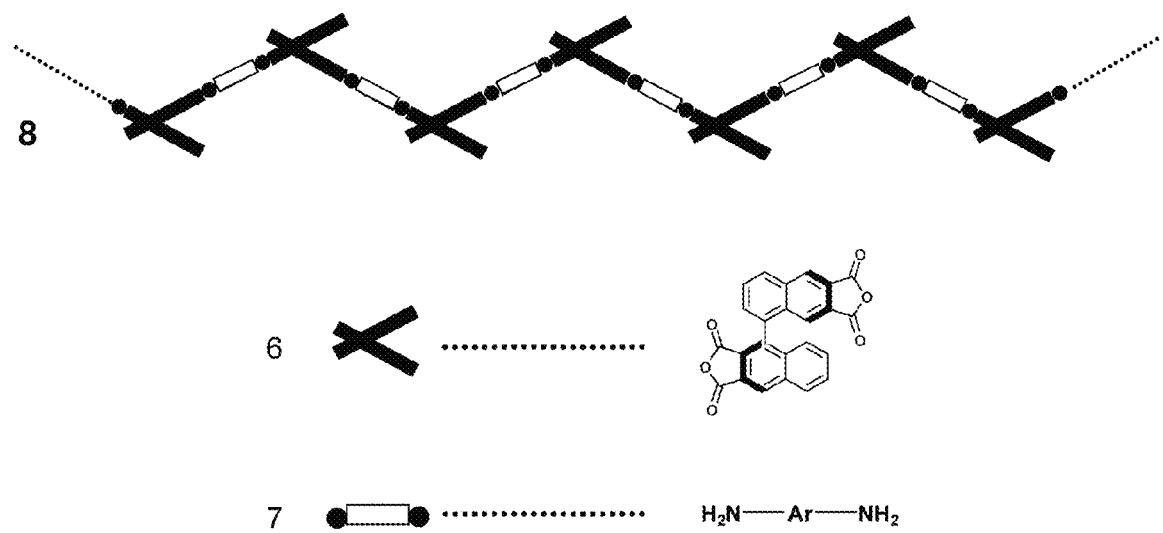
FIG. 4 is the schematic diagram of the structure of the backbone of the polyimide formed in the examples of the invention employing the reaction between binaphthyl tetracarboxylic dianhydride and an aromatic diamine.

The invention employs the compound as shown in Formula 2 or Formula 3 (that is, binaphthyl tetracarboxylic dianhydride, bianthracyl tetracarboxylic dianhydride and substituted binaphthyl tetracarboxylic dianhydride or bianthracyl tetracarboxylic dianhydride) which has a molecular structure of an X shape itself which is not coplanar, such as shown in FIG. 4 (here only binaphthyl tetracarboxylic dianhydride is used as an example for illustration) After the X-shaped binaphthyl tetracarboxylic dianhydride 6 is polymerized with the aromatic diamine 7, the polyimide 8 thus generated has a backbone of a twisted W shape and has tactic spatial configuration. The positions of the holes on the backbone of polyimide 8 greatly favor the homogenous directional alignment of the surface liquid crystal molecules. Moreover, the high proportion of aromatic groups on the polyimide backbone favors the enhancement of directional effect on the liquid crystal molecules. Additionally, the polyimide backbone exhibits a twisted W shape, which can reduce the π-π attractive interaction between chains, preventing the surface liquid crystal molecules of the polyimide alignment film in different regions of the backbone from reducing the contrast of the liquid crystal display due to difference in twisting angles.

Figure 5:
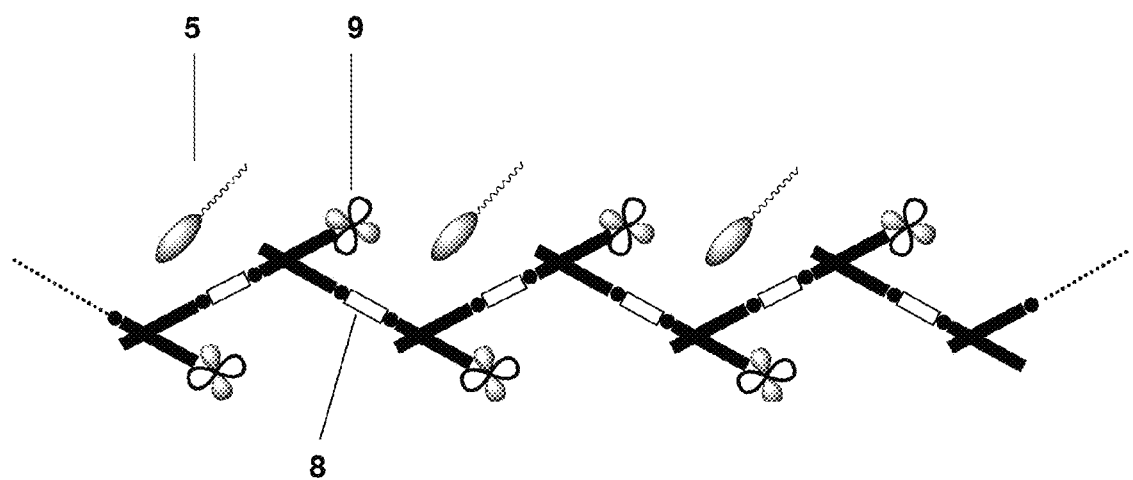
FIG. 5 is the schematic diagram of the backbone structure of the polyimide formed in the examples of the invention employing the reaction between substituted binaphthyl tetracarboxylic dianhydride or bianthracyl tetracarboxylic dianhydride and an aromatic diamine.

Moreover, in the invention, the direction of the alignment of the liquid crystal molecules can be regulated by controlling the substituent on binaphthyl tetracarboxylic dianhydride and bianthracyl tetracarboxylic dianhydride. As shown in FIG. 5, bulky substituent 9 such as tolyl (Formula 2a), t-butyl (Formula 2b), triphenylmethyl (Formula 2c) and the like can be incorporated onto polyimide 8. Because of the spatial effect of these substituents, the liquid crystal molecule 5 on the surface of the polyimide 8 can only be adsorbed to one direction, thereby improving the homogeneity of the alignment of the liquid crystal molecules. Moreover, substituents with proper sizes can also be chosen according to practical situation to obtain the regulation of the alignment direction of the liquid crystal molecules to satisfy different requirements on pretilt angles and display modes.

Formula 2a

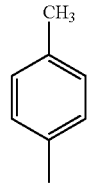

Formula 2b

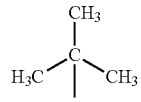

Formula 2c

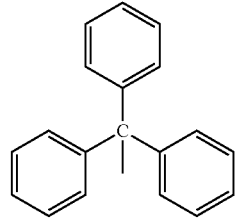

The (weight average) molecule weight of the polyimide used to form the liquid crystal alignment film is, for example, 1,000-10,000, preferably 2,000-8,000, more preferably 3,000-5,000.

The invention further provides a method for preparing the aforementioned liquid crystal alignment film comprising following steps:
1) under nitrogen protection, a compound as shown in Formula 2 or Formula 3 is mixed with an aromatic diamine of Formula 1 in a solvent and agitated to react, for example, for 24 hours, to obtain a polyamic acid;

Formula 1

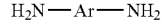

Formula 2

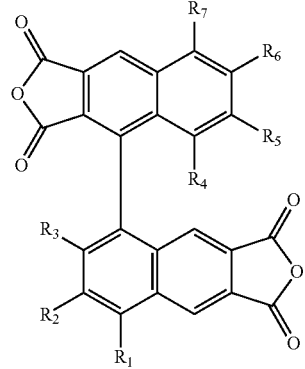

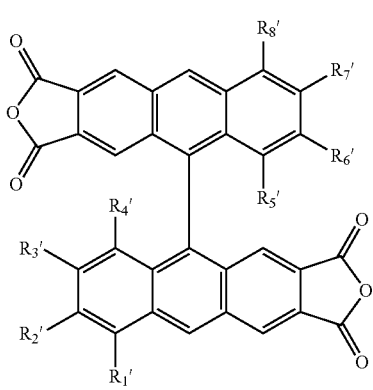

Formula 3

2) the polyamic acid is evenly coated onto the substrate and subject to heating at about 80-100° C., for example, for 1 h, to evaporate some solvent and cyclize some polyamic acid, and then subject to heating at about 210-240° C., for example, for 1 h, to obtain the polyimide liquid crystal alignment film of the invention.

The reaction or heating time in the steps 1) and 2) can be adjusted depending on the specific temperature, the amount of raw materials, and the like.

Wherein the compound as shown in Formula 2 or Formula 3 in the step 1) can be the compound as shown in Formula 2 or Formula 3 in the aforementioned liquid crystal alignment film, and is not repeated here. The solvent in the step 1) can be N-methylpyrrolidone, γ-butyrolactone or ethylene glycol monobutyl ether, or the like.

Figure 6:
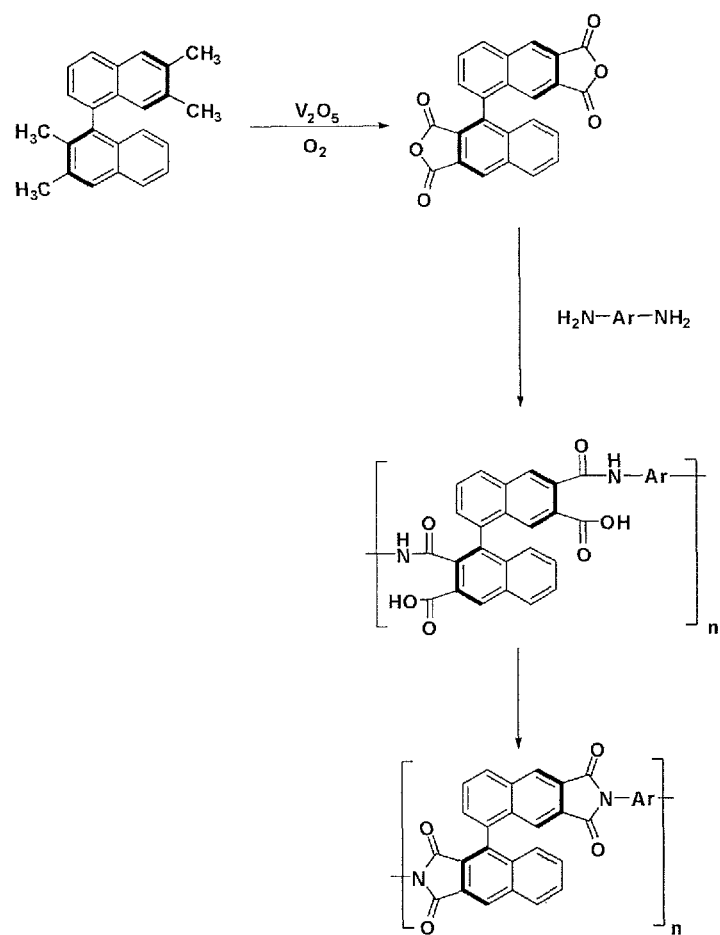
FIG. 6 is the schematic diagram of the reaction in the examples of the invention employing tetramethylbinaphthalene as the precursor to prepare the polyimide alignment film.

The compound as shown in Formula 2 or Formula 3 of the invention can be prepared by employing conventional methods. Taking binaphthyl tetracarboxylic dianhydride as an example, as shown in FIG. 6, binaphthyl tetracarboxylic dianhydride is prepared with tetramethyl binaphthalene as a precursor. First, tetramethyl binaphthalene is oxidized under the catalysis of $V_2O_5$ to generate binaphthyl tetracarboxylic dianhydride, and then binaphthyl tetracarboxylic dianhydride is reacted with an aromatic diamine to generate polyamic acid, which is then heated to obtain the polyimide alignment film.

The invention provides a polyimide liquid crystal alignment film, in which the configuration of the polyimide backbone in the alignment film is changed to reduce the π-π interaction between the polyimide backbones to make the alignment film structure more tactic, which is more advantageous to the directional and consistent alignment of the liquid crystal molecules, thereby increasing the contrast of the display. Specifically, the molecular structure of the polyimide of the invention itself exhibits a non-coplanar X shape as shown below:

Formula III

The backbone of the polyimide generated by the reaction between Formula 1 with Formula 2 or 3 exhibits a twisted W shape having a dihedral angle, and has a tactic spatial configuration. The positions of the holes on the polyimide backbone greatly favor the homogenous and directional alignment of the surface liquid crystal molecules. Moreover, the high proportion of aromatic groups on the polyimide backbone favors the enhancement of directional effect on the liquid crystal molecules. Additionally, the polyimide backbone exhibits a twisted W shape, which can reduce the π-π attractive interaction between chains, preventing the surface liquid crystal molecules of the polyimide alignment film in different regions of the backbone from reducing the contrast of the liquid crystal display due to difference in twisting angles.

The invention further provides a liquid crystal display device comprising the aforementioned liquid crystal alignment film.

Below are the specific examples of the liquid crystal alignment film of the invention:

(A) Preparation of the Liquid Crystal Alignment Film

Example 1

1) 15.5 g of dianhydride precursor A is oxidized under the action of the catalyst $V_2O_5$ to generate dianhydride B.

2) Under nitrogen protection, the dianhydride B thus generated is mixed with 9 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 1 of the invention.

The dihedral angle of the polyimide obtained in Example 1 is calculated, for example, using Gaussain 03 program with B3LYP/3-21G method, to be 42.1°.

Example 2

1) 15.5 g of dianhydride precursor A is oxidized under the action of the catalyst $V_2O_5$ to generate dianhydride B.

2) Under nitrogen protection, the dianhydride B thus generated is mixed with 9.5 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 2 of the invention. The dihedral angle of the polyimide obtained in Example 2 is calculated according to the method of Example 1 to be 42.4°.

Example 3

1) 18 g of dianhydride precursor A is oxidized under the action of the catalyst $V_2O_5$ to generate dianhydride B.

2) Under nitrogen protection, the dianhydride B thus generated is mixed with 5 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 3 of the invention. The dihedral angle of the polyimide obtained in Example 3 is calculated according to the method of Example 1 to be 39.6°.

Example 4

1) 18 g of dianhydride precursor A is oxidized under the action of the catalyst $V_2O_5$ to generate dianhydride B.

2) Under nitrogen protection, the dianhydride B thus generated is mixed with 5 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 4 of the invention. The dihedral angle of the polyimide obtained in Example 4 is calculated according to the method of Example 1 to be 40.8°.

Example 5

1) 17 g of dianhydride precursor A is oxidized under the action of the catalyst $V_2O_5$ to generate dianhydride B.

2) Under nitrogen protection, the dianhydride B thus generated is mixed with 9 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 5 of the invention. The dihedral angle of the polyimide obtained in Example 5 is calculated according to the method of Example 1 to be 43.1°.

Example 6

1) 17 g of dianhydride precursor A is oxidized under the action of the catalyst $V_2O_5$ to generate dianhydride B.

2) Under nitrogen protection, the dianhydride B thus generated is mixed with 9 g diamine C6 in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 6 of the invention. The dihedral angle of the polyimide obtained in Example 6 is calculated according to the method of Example 1 to be 43.8°.

Example 7

1) 17 g of dianhydride precursor A is oxidized under the action of the catalyst $V_2O_5$ to generate dianhydride B.

2) Under nitrogen protection, the dianhydride B thus generated is mixed with 9 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 7 of the invention. The dihedral angle of the polyimide obtained in Example 6 is calculated according to the method of Example 1 to be 48.1°. In Example 7, the dihedral angle increases due to the hindrance effect of the methane substituent in the ortho position of the binaphthalene.

Example 8

1) 18.5 g of dianhydride precursor A is oxidized under the action of the catalyst $V_2O_5$ to generate dianhydride B.

2) Under nitrogen protection, the dianhydride B thus generated is mixed with 9 g diamine C in 200 ml dry NMP solution and agitated for 24 h to obtain polyamic acid D.

3) Polyamic acid D is evenly coated onto a substrate, and first subject to heating at 80-100° C. for about 1 h, to evaporate some solvent and cyclize some polyamic acid D, and then subject to heating at 210-240° C. for about 1 h to generate polyimide E, thereby obtaining alignment film 8 of the invention. The dihedral angle of the polyimide obtained in Example 8 is calculated according to the method of Example 1 to be 42.6°.

In the invention, the characteristic infrared data of the polyamic acid obtained in Examples 1-8 are measured:

IR (KBr): 1660 $cm^{-1}$, 3260-3270 $cm^{-1}$, 1720 $cm^{-1}$

The polyamic acid liquid thus obtained is then coated on the surface of the substrate. First, the substrate coated with the polyamic acid liquid is heated at 100° C. for about 2 min for the pre-curing, and then heated at 230° C. for about 1 h for the primary curing to obtain a polyimide liquid crystal alignment film. In the infrared spectrum, little of the stretching vibration of the carbonyl group in the amide group (1600 $cm^{-1}$) and little of the vibration of the carbonyl group in the carboxylic group in the aromatic carboxylic acid (1720 $cm^{-1}$) are observed together with the absorption peak of the carbonyl group of the diamine (1730 $cm^{-1}$), indicating the ring closing reaction between the amide group and the carboxylic group in the polyamic acid to generate the polyimide.

The molecular structural formulae of the various components in the aforementioned examples are referred to in Table 1 and 2.

TABLE 1

The molecular structural formula of the components A, B and C in Examples 1-8

| Example | A | B | C |
|---|---|---|---|
| Example 1 | [structural formula of binaphthalene with methyl substituents] | [structural formula of dianhydride] | $H_2N$—[biphenyl]—$NH_2$ |

TABLE 1-continued

The molecular structural formula of the components A, B and C in Examples 1-8

| Example | A | B | C |
|---|---|---|---|
| Example 2 | | | $H_2N$—⟨⟩—O—⟨⟩—$NH_2$ |
| Example 3 | | | $H_2N$—⟨⟩—$NH_2$ |
| Example 4 | | | $H_2N$—⟨⟩—$NH_2$ |
| Example 5 | | | $H_2N$—⟨⟩—⟨⟩—$NH_2$ |
| Example 6 | | | $H_2N$—⟨⟩—⟨⟩—$NH_2$ |

TABLE 1-continued

The molecular structural formula of the components A, B and C in Examples 1-8

| Example | A | B | C |
|---|---|---|---|
| Example 7 | | | |
| Example 8 | | | |

TABLE 2

The molecular structural formula of the components D and E in Examples 1-8

| Example | D |
|---|---|
| Example 1 | |
| Example 2 | |

TABLE 2-continued
The molecular structural formula of the components D and E in Examples 1-8
Example 3
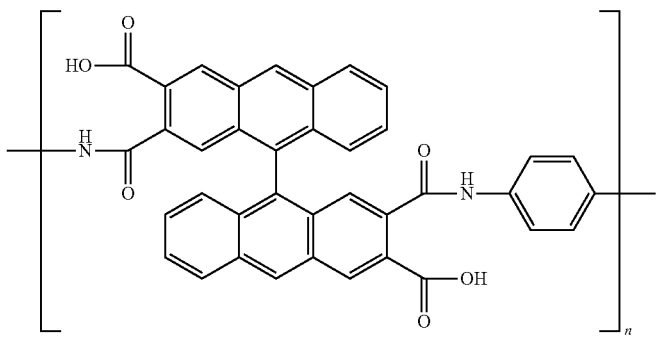
Example 4
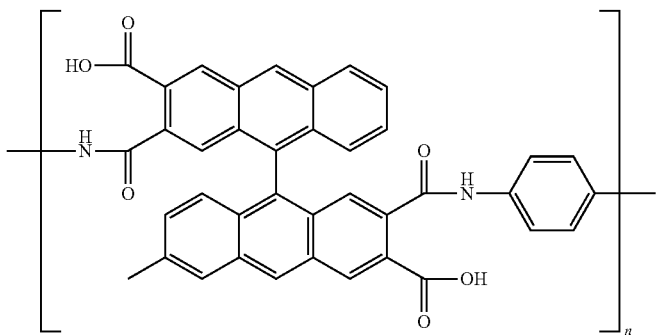
Example 5
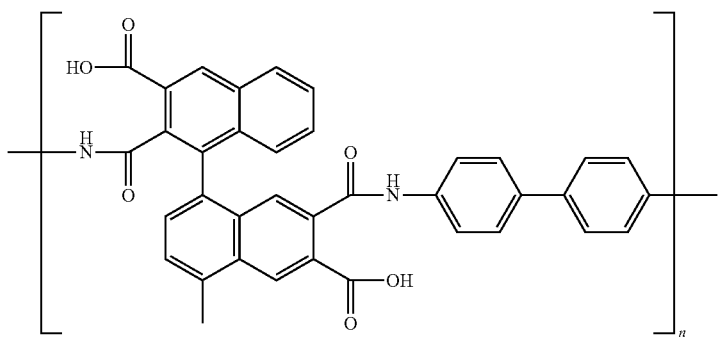
Example 6
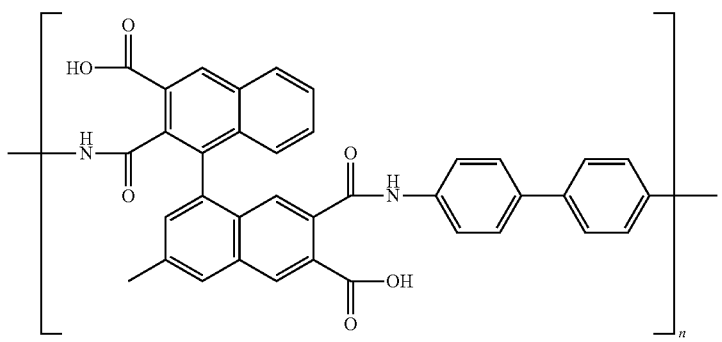

TABLE 2-continued
The molecular structural formula of the components D and E in Examples 1-8
| Example 7 | 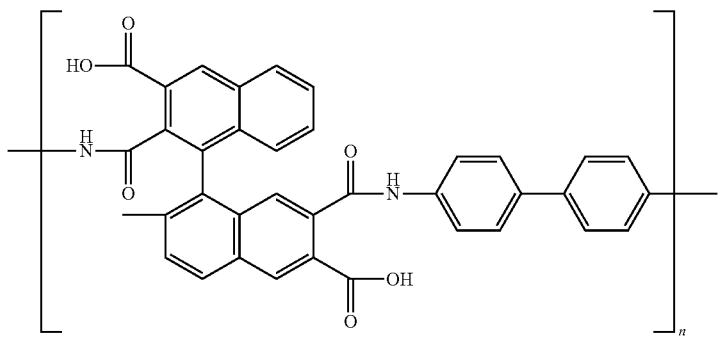 |
| Example 8 | 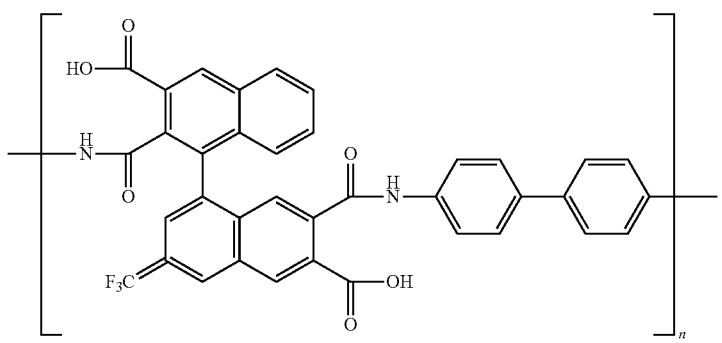 |
| Example | E |
| Example 1 | 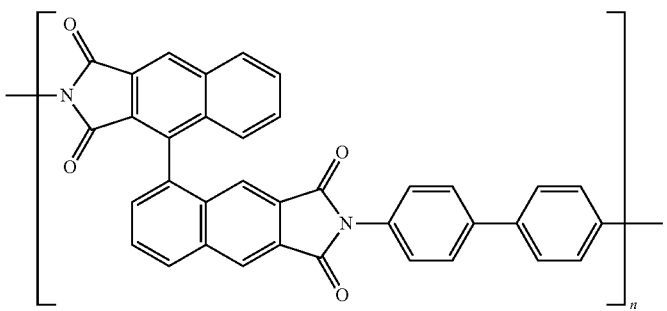 |
| Example 2 | 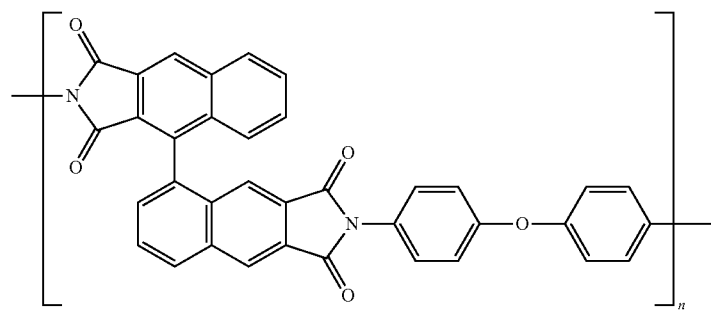 |

TABLE 2-continued
The molecular structural formula of the components D and E in Examples 1-8
Example 3 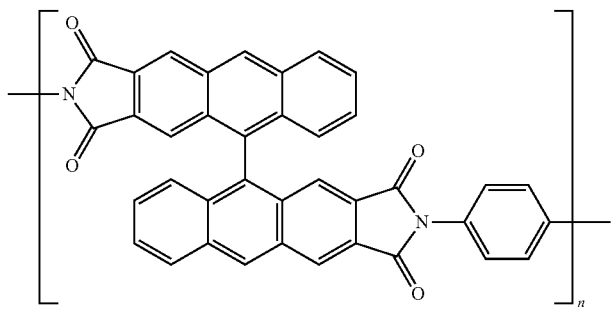
Example 4 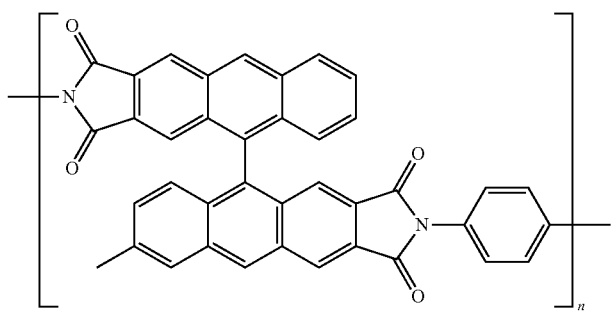
Example 5 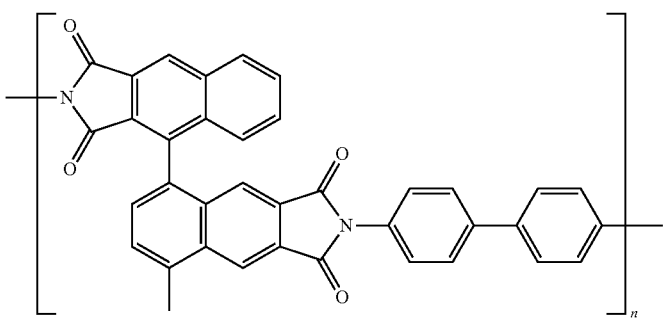
Example 6 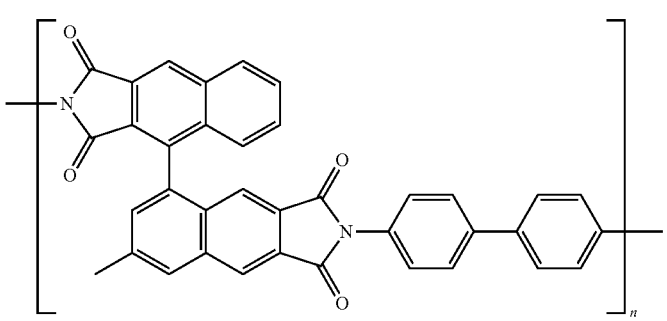
Example 7 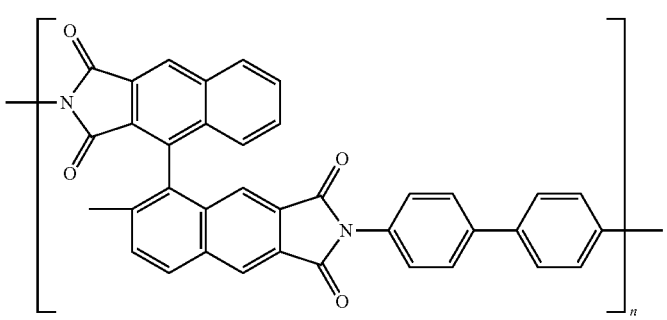

TABLE 2-continued

The molecular structural formula of the components D and E in Examples 1-8

Example 8

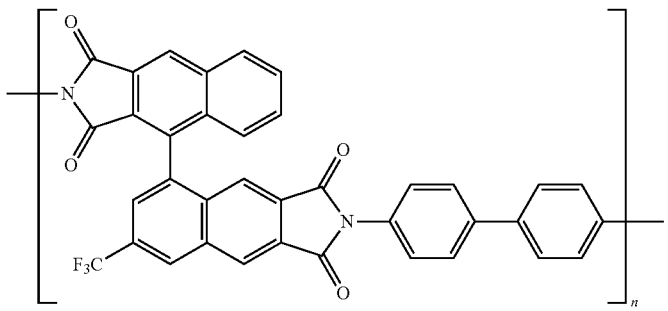

(B) Comparative Examples

The alignment films 1-8 in the aforementioned Examples 1-8, as well as the prior art alignment film (manufactured by employing Japan Nissan SE-7951 polyimide prepolymer precursor, hereinafter briefly as "alignment film SE-7951") are used in liquid crystal displays. That is, liquid crystal displays are manufactured by employing the same process but using the alignment films 1-8 and the alignment film SE-7951, respectively, for a contrast test.

(C) Contrast Test

The contrast of the liquid crystal displays manufactured using the alignment films 1-8 and the alignment film SE-7951, respectively, is measured by employing the BMSA optical measurement system (Nieo Co.).

TABLE 3

Test of the alignment films of Example 1-8

| Example | Contrast |
| --- | --- |
| alignment film 1 | 975 |
| alignment film 2 | 975 |
| alignment film 3 | 954 |
| alignment film 4 | 966 |
| alignment film 5 | 1103 |
| alignment film 6 | 1089 |
| alignment film 7 | 989 |
| alignment film 8 | 967 |
| alignment film SE-7951 | 933 |

As can be seen from Table 3, the contrast of the liquid crystal displays manufactured employing the liquid crystal alignment films of the examples of the invention is 954-1103, higher than the contrast of the liquid crystal display manufactured employing the prior art alignment film SE-7951. Therefore, the invention employs binaphthyl tetracarboxylic dianhydride, bianthracyl tetracarboxylic dianhydride, substituted binaphthyl tetracarboxylic dianhydride or substituted bianthracyl tetracarboxylic dianhydride of which a molecular structure itself exhibits a non-coplanar X shape to react with an aromatic diamine to prepare a polyimide having a backbone in a twisted W shape, which favors the reduction of the π-π attractive interaction between backbones of the polyimide, enhances the directional effect on the liquid crystal molecules, and thereby favors the directional and homogenous alignment of the liquid crystal molecules on the surface of the polyimide and increases the contrast of the liquid crystal display.

The embodiments of the invention provides a liquid crystal alignment film and the method for preparing the same which primarily have the following advantages: (A) For the liquid crystal alignment film of the embodiments of the invention, binaphthyl tetracarboxylic dianhydride, bianthracyl tetracarboxylic dianhydride, substituted binaphthyl tetracarboxylic dianhydride or substituted bianthracyl tetracarboxylic dianhydride of which a molecular structure itself exhibits a non-coplanar X shape is employed to react with an aromatic diamine to prepare a polyimide alignment film, so that the backbone of the polyimide thus generated exhibits a W shape and has a tactic spatial configuration. Compared with the traditional straight chain polyimide, the liquid crystal alignment film of the embodiments of the invention has a high proportion of aromatic groups in the polyimide backbone, which favors the enhancement of the directional effect on the liquid crystal molecules. Moreover, the backbone exhibits a twisted W shape, which decreases the π-π attractive interaction between backbones of the polyimide, enhances the interaction between the liquid crystal molecules and the polyimide, allows the directional and homogenous alignment of the liquid crystal molecules on the surface of the polyimide and thereby increases the contrast of the liquid crystal display. (B) Embodiments of the invention further incorporate different substituents into the molecules of binaphthyl tetracarboxylic dianhydride, bianthracyl tetracarboxylic dianhydride, and the like, so that the liquid crystal molecules near the polyimide can only be adsorbed to one side due to the spatial effect of the substituents, thereby increasing the homogeneity of the alignment of the liquid crystal molecules. Furthermore, different pretilt angles can be obtained by choosing substituents of different sizes, thereby achieving the regulation of the directions of the alignment of the liquid crystal molecules to satisfy the different requirements on pretilt angles and display modes.

It would be apparent that the embodiments described are merely some embodiments, rather than all embodiments of the invention. Any other embodiments obtainable by a person of ordinary skill in the art without resorting to creative labor should fall into the scope of protection of the invention.

The invention claimed is:

1. A liquid crystal alignment film comprising a polyimide, wherein the polyimide is obtained by reacting a compound as shown in Formula 2 or Formula 3 with an aromatic diamine of Formula 1,

          Formula 1 wherein the Ar in Formula 1 is an aryl,

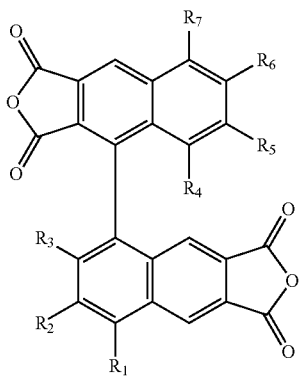

Formula 2

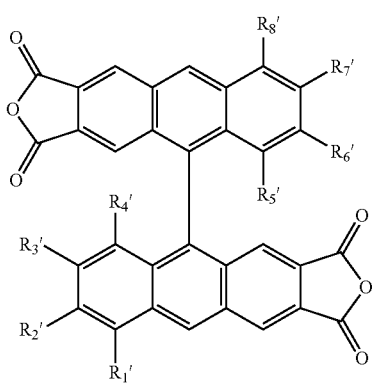

Formula 3 wherein the $R_1, R_2, R_3, R_4, R_5, R_6, R_7, R_1', R_2', R_3', R_4', R_5', R_6', R_7'$, or $R_8'$ is H, an alkyl, an aralkyl or a haloalkyl.

2. The liquid crystal alignment film according to claim 1, wherein the polyimide comprises a recurring structural unit having following formula:

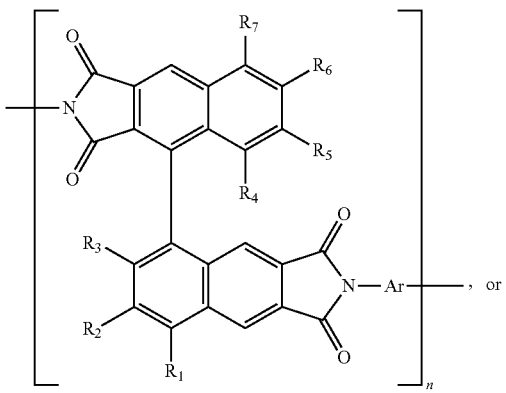

Formula I

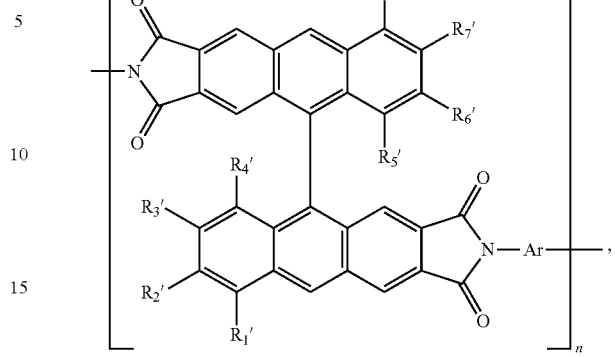

Formula II wherein

Ar is an aryl, the $R_1, R_2, R_3, R_4, R_5, R_6, R_7, R_1', R_2', R_3', R_4', R_5', R_6', R_7'$, or $R_8'$ is H, an alkyl, an aralkyl or a haloalkyl, n is an integer of 2-20.

3. The liquid crystal alignment film according to claim 1, wherein the $R_1, R_2, R_3, R_4, R_5, R_6, R_7, R_1', R_2', R_3', R_4', R_5'$, $R_6', R_7'$, or $R_8'$ is an alkyl containing 1-10 carbon atoms, an aralkyl containing 6-20 carbon atoms or a haloalkyl containing 1-10 carbon atoms; and the Ar is a phenyl, a biphenylyl or a diphenyl ether radical.

4. The liquid crystal alignment film according to claim 3, wherein the alkyl is a methyl, an ethyl, a n-propyl, an isopropyl, a n-butyl, an isobutyl or a t-butyl.

5. The liquid crystal alignment film according to claim 3, wherein the aralkyl is a phenyl, a tolyl, a benzyl or a triphenylmethyl.

6. The liquid crystal alignment film according to claim 3, wherein the haloalkyl is a difluoromethyl or a trifluoromethyl.

7. A liquid crystal display device, wherein said liquid crystal display device comprises the liquid crystal alignment film according to claim 1.

8. A method for preparing a liquid crystal alignment film comprising following steps:

1) under nitrogen protection, a compound as shown in Formula 2 or Formula 3 is mixed with an aromatic diamine of Formula 1 in a solvent and agitated to obtain a polyamic acid;

Formula 1

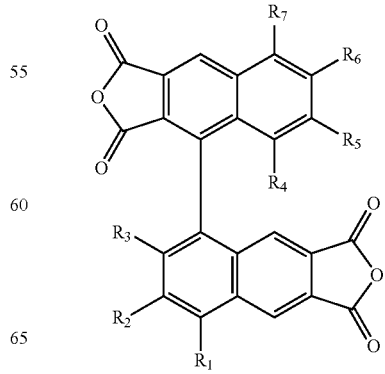

Formula 2

-continued

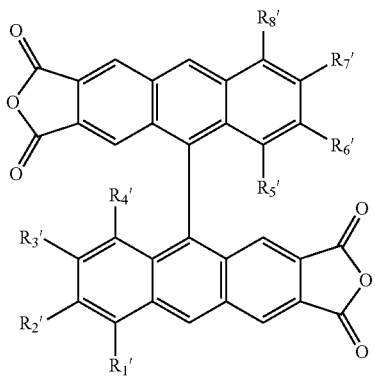

Formula 3 wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is H, an alkyl, an aralkyl or a haloalkyl, and the Ar in Formula 1 is an aryl; and 2) the polyamic acid is evenly coated onto a substrate and subject to heating to obtain the polyimide liquid crystal alignment film.

9. The method of preparation according to claim 8, wherein
   the duration of mixing and agitation in the step 1) is about 24 h; and
   in the step 2), after the polyamic acid is evenly coated onto the substrate, the polyamic acid is first subject to heating at about 80-100° C., then at about 210-240° C.

10. The method of preparation according to claim 8, wherein the solvent is N-methylpyrrolidone, γ-butyrolactone or ethylene glycol monobutyl ether.

11. The method of preparation according to claim 9, wherein the $R_1$, $R_2$, $R_3$, $R_4$, $R_5$, $R_6$, $R_7$, $R_1'$, $R_2'$, $R_3'$, $R_4'$, $R_5'$, $R_6'$, $R_7'$, or $R_8'$ is an alkyl containing 1-10 carbon atoms, an aralkyl containing 6-20 carbon atoms or a haloalkyl containing 1-10 carbon atoms; and the Ar is a phenyl, a biphenylyl or a diphenyl ether radical.

12. The method of preparation according to claim 11, wherein the alkyl is a methyl, an ethyl, a n-propyl, an isopropyl, a n-butyl, an isobutyl or a t-butyl; the aralkyl is a phenyl, a tolyl, a benzyl or a triphenylmethyl; and the haloalkyl is a difluoromethyl or a trifluoromethyl.

* * * * *